May 15, 1923.
A. O. LARSON
1,455,534
SPRING MOTOR DRIVEN FAN AND STOP THEREFOR
Filed Nov. 25, 1921
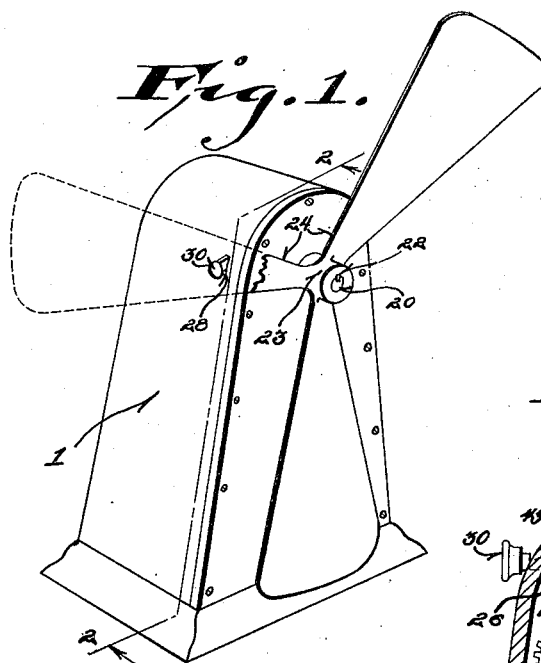
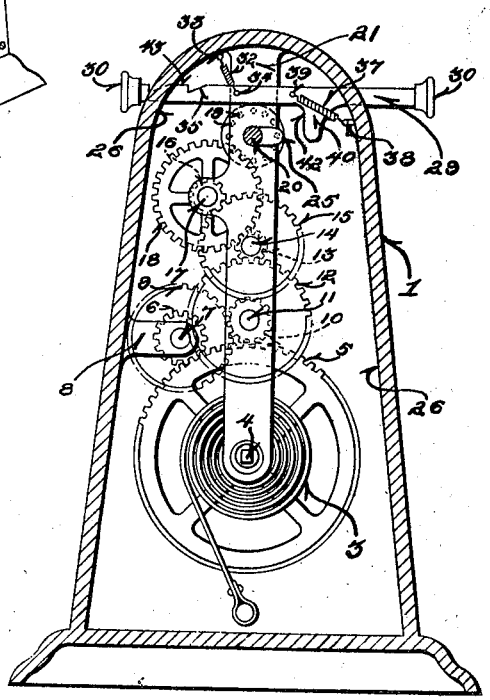
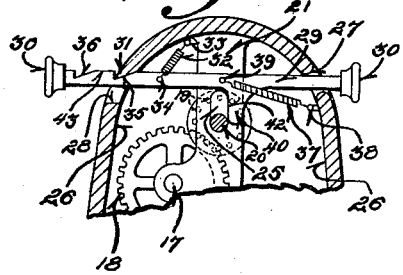

Patented May 15, 1923.

1,455,534

UNITED STATES PATENT OFFICE.

ALFRED O. LARSON, OF RIO, WISCONSIN.

SPRING-MOTOR-DRIVEN FAN AND STOP THEREFOR.

Application filed November 25, 1921. Serial No. 517,646.

*To all whom it may concern:*

Be it known that I, ALFRED O. LARSON, a citizen of the United States, and resident of Rio, in the county of Columbia and State of Wisconsin, have invented certain new and useful Improvements in Spring-Motor-Driven Fan and Stops Therefor; and I do hereby declare that the following is a full, clear, and exact description thereof.

This invention relates to a spring motor driven fan, and particularly to an improved starting and stopping device for the spring motor, and one of the objects of the invention is to provide an improved device of this nature, in which efficient and practical details of construction are involved.

One of the features of construction is to provide means cooperating with the fan carrying shaft for starting and stopping the spring motor.

Another object of the invention is to provide such starting and stopping means that will not strip the gear teeth from any of the gears of the spring motor.

In practical fields the details of construction may necessitate alterations, falling within the scope of what is claimed.

The invention comprises further features and combination of parts, as hereinafter set forth, shown in the drawings and claimed.

In the drawings:

Figure 1 is a view in perspective of the motor driven fan constructed in accordance with the invention.

Figure 2 is a vertical sectional view on line 2—2 of Figure 1, and

Figure 3 is a detail sectional view of the upper part of the casing of the motor, illustrating the starting and stopping device cooperating with a member on the fan carrying shaft, to hold the shaft at rest, thereby stopping the motor.

Referring more especially to the drawing, 1 designates a suitable casing, in which the motor 2 is mounted, which motor in the present instance is operated by a spring 3. The motor comprises the spring operated shaft 4 having the main gear 5, which meshes with the gear 6 on the shaft 7, which is mounted in the bearing 8. A gear 9 is mounted on the shaft 7, and in turn meshes with the gear 10 on the shaft 11, on which the gear 12 is mounted. The gear 12 in turn meshes with the gear 13 on the shaft 14, which has the gear 15, which in turn meshes with the gear 16 on the shaft 17, which is provided with a gear 18. The gear 18 meshes with the gear 19 on the shaft 20. The shafts 4, 11, 14, 17 and 20 are mounted in bearings of the casing, and in bearings of the arm 21, which depends from the upper wall of the casing. Keyed upon one end of the shaft 20 as at 22 is the hub 23 of the fan 24. This shaft 20 is provided with a laterally extending lug or enlargement 25. The opposite side walls 26 of the casing near the top thereof are provided with openings 27 and 28 acting as bearings for the transversely disposed reciprocating bar 29, the ends of which are provided with knobs or heads 30.

The opening 28 is larger than the opening 27, and is provided with a tooth 31. Owing to the opening 28 being larger than the bar 29, one end of the bar is permitted to lower, using the other openings 27 as a fulcrum. A spring 32 which is connected to the casing at 33, is in turn connected at 34 to the bar 29, thereby holding the loosely mounted end of the bar 29 upwardly in the upper part of the opening 28 so that either one of the notches 35 and 36 will be engaged by the tooth 31. A spring 37 is connected at 38 to one side of the casing, and is in turn connected at 39 to the bar 29. When the bar 29 is in the position shown in Figure 3 the abutment lug 40 is in contact with the lug 25 of the shaft 20, thereby preventing the shaft 20 and the fan thereon from rotating. The pressure of the lug 25 against the abutment lug 40 and the actions of the springs 32 and 37 tend to hold the notch 35 in engagement with the tooth 31. When it is desired to release the shaft 20, thereby permitting it to revolve as well as the fan thereon, the operator grasps the knob 30 on the left hand end of the bar 29 and lowers the end of the bar having the notches 35 and 36, disengaging the notch 35 from the tooth 31, in which case the springs 32 and 37 will draw the bar 29 to the position shown in Figure 2, so that the notch 36 will engage the tooth 31, in which case the lug 40 is moved out of contact with the lug 25, thereby leaving the shaft 20 with its fan free to rotate. When it is desired to stop the shaft 20 and its fan the operator may push upon the head 30 upon the right hand end of the bar 29, so as to move the bar 29 toward the left, in which case the lug 25 will ride against the portion 42 of the bar 29, substantially at the same time that the tooth 43 (which is between the notches 35 and 36) is riding by or is in engagement with the tooth 31, in which case the shaft 20 will begin to gradually stop, but just so soon as the notch 35 engages the tooth 31, the lug 40 will again abut the lug 25, thereby stopping the shaft 20. However, the operator may pull upon the head 30 of the left hand end of the rod 29, and at the same time lower the left hand end of the bar 29, and hold said bar in such position with the notch 35 directly under the tooth 31 ready to engage the tooth 31, and as the lug 25 engages the portion 42 of the bar 29, the operator may permit the left hand end of the bar 29 to gradually ascend, allowing the lug 25 to frictionally ride against the bar, until the notch 35 will engage the tooth 31, in which case the lugs 25 and 40 will then be in engagement as shown in Figure 3, thereby stopping the shaft 20 and the fan. This method of starting and stopping the spring motor will prevent the teeth of the gear 18 from being stripped, which would occur, if said teeth were engaged by the tooth of a pivoted lever.

I claim:

In combination with a motor operated fan including a casing and having a motor driven shaft therein, said shaft having a fan thereon and provided with a laterally extending lug, said casing having openings in its opposite side walls, one opening being larger than the other and provided with a tooth, a bar mounted in said opening and adapted to be moved transversely, spring tensioning means for said bar, said bar having a lug to cooperate with the lug of the motor driven shaft adapted to stop the shaft, one end of the bar having a pair of notches, one of which is designed to hold the bar with its lug in contact with the lug of the shaft, to hold the shaft against rotation, the other notch adapted to engage the tooth of the larger opening to hold the bar in another position with its lug out of engagement with the lug of the shaft to permit the shaft to rotate, said larger opening constituting means to permit the bar to be lowered at the same time it is pulled in one direction, so that the lug of the shaft may ride upon the bar to allow the shaft to gradually stop until its lug contacts with the lug of the bar.

In testimony that I claim foregoing I have hereunto set my hand at Rio, in the county of Columbia and State of Wisconsin.

ALFRED O. LARSON.